May 18, 1926. 1,585,056
H. A. TRUSSELL
INTERNAL COMBUSTION ENGINE THROTTLING AND FUEL HEATING APPARATUS
Filed Feb. 10, 1922 2 Sheets-Sheet 1
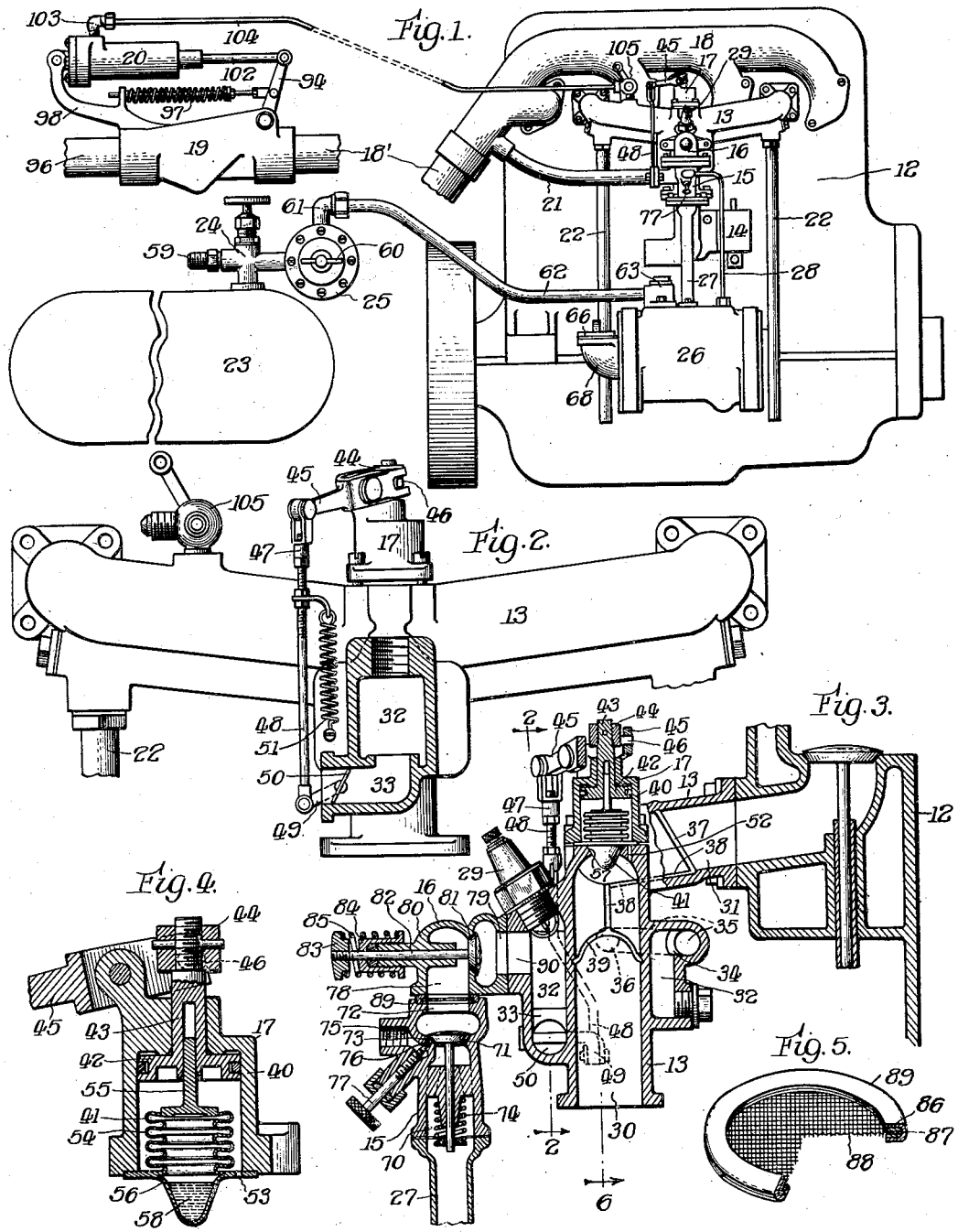
Witness:
A. J. Sauser
Inventor:
Homer A. Trussell May 18, 1926. 1,585,056
H. A. TRUSSELL
INTERNAL COMBUSTION ENGINE THROTTLING AND FUEL HEATING APPARATUS
Filed Feb. 10, 1922 2 Sheets-Sheet 2
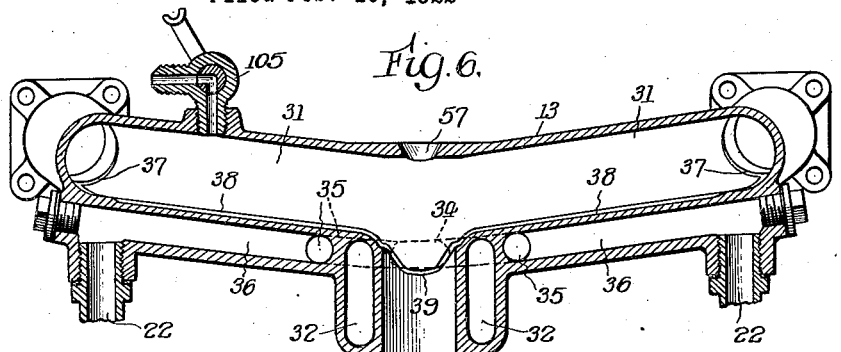
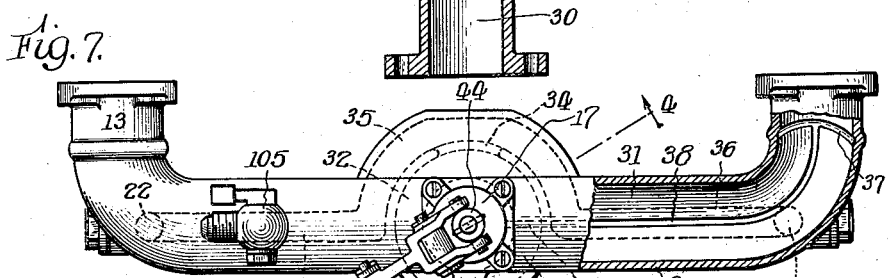
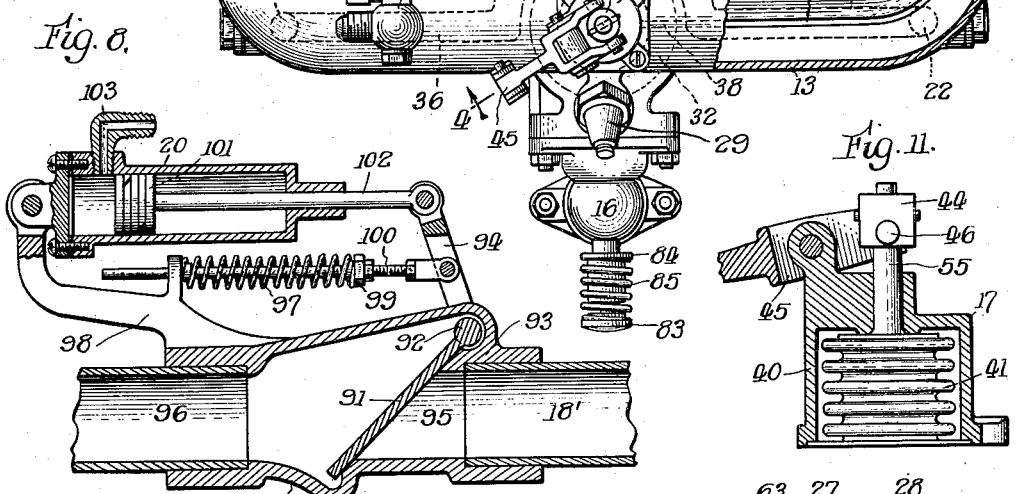
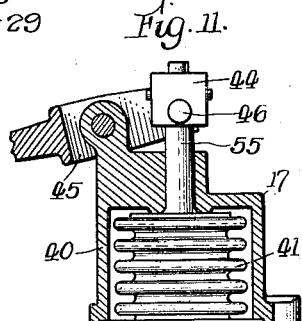
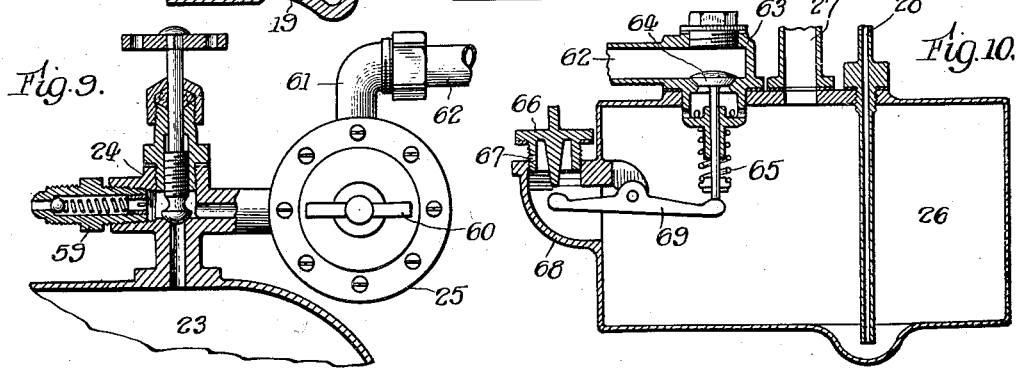
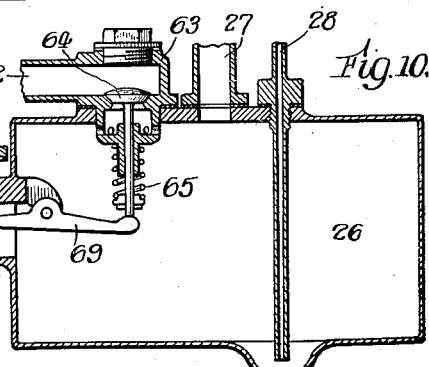
Witness:
A. J. Sauser
Inventor:
Homer A Trussell Patented May 18, 1926.

1,585,056

UNITED STATES PATENT OFFICE.

HOMER A. TRUSSELL, OF CHICAGO, ILLINOIS.

INTERNAL-COMBUSTION-ENGINE THROTTLING AND FUEL-HEATING APPARATUS.

Application filed February 10, 1922. Serial No. 535,495.

My invention relates to internal combustion engine throttling and fuel heating apparatus, and has among its various objects the provision of a construction which —

First, reduces fuel and lubricating oil consumption by restricting the exhaust passage in proportion to the volume of fuel being admitted to the combustion chamber;

Second, permits the fuel inlet passage to be heated prior to starting;

Third, maintains predetermined temperatures of the fuel inlet passage with waste heat while the engine is working;

Fourth, permits of heating the same parts of the inlet passage whether preheating prior to starting or heating with exhaust gas while the engine is working;

Fifth, regulates the temperature of the inlet passage with relation to the pressure and temperature of the fluid in the inlet passage;

Sixth, applies heat to the lower portions of the fuel inlet passage where fuel in liquid form will gravitate when the engine is running with fractional loads, these portions being situated so that the incoming fluid is not impinged against them hence little heat is absorbed by the incoming fuel at high engine speeds and volumetric efficiency is maintained;

Seventh, collects liquid from the fuel in the inlet passage, spreads the liquid in a film upon a heated portion of the inlet passage adjacent its inlet, thereby vaporizing the liquid fuel and mixing it with the incoming charge;

Eighth, accomplishes proper vaporization of the fuel with the minimum application of heat to the incoming charge;

Ninth, prevents irregular running and backfiring in the fuel inlet while the engine is being accelerated with a slowly burning mixture.

Tenth, passes all of the exhaust gas through the inlet heater while the inlet passage is cold and the engine is running with a small inlet throttle opening; none with the throttle wide open if the inlet passage is warm enough; and a proportionate amount for intermediate conditions;

Eleventh, reduces the amount of fuel and time required for starting and warming up an engine.

I attain these and other objects by the mechanism illustrated in the accompanying drawings, in which—

Fig. 1 is a side elevation of an engine fitted with apparatus according to the invention;

Fig. 2, an enlarged side elevation of the inlet manifold with the temperature regulator in place, partially in section on line 2—2 of Fig. 3;

Fig. 3, a vertical section of the inlet manifold with the generator valve and temperature regulator in place and coupled with a section of the engine valve port;

Fig. 4, a vertical section of the temperature regulator on the line 4—4 of Fig. 7;

Fig. 5, a perspective view of the safety screen partially in section;

Fig. 6, a longitudinal section of the inlet manifold on line 6—6 of Fig. 3;

Fig. 7, a plan view of the inlet manifold with the temperature regulator and the generator valve in place, and having a portion broken away for the purpose of illustration;

Fig. 8, an enlarged central section of the exhaust throttle and its operating cylinder with piston;

Fig. 9, an enlarged central section of the air supply tank, shut-off and check valves, with the pressure regulator in place;

Fig. 10, an enlarged central section of the fuel and low pressure air tank;

And Fig. 11, a modification of the device shown in Fig. 4.

The invention is shown as applied to a four cylinder internal combustion engine, it being understood, however, that it is not limited to this particular type of engine, and it is obvious that the invention is applicable to engines employing any number of cylinders.

In the particular structure illustrated in the drawings, compressed air and liquid fuel are used for the preheating of the inlet manifold, and the exhaust throttle is operated by the suction in the inlet manifold, the precise arrangement, however, need not be adhered to as the apparatus is susceptible of various changes and modifications which may be made without departing from the spirit of the invention.

The device illustrated in Fig. 1 includes the engine 12, the inlet manifold 13, the carburetor 14, the generator valve 15, the generator valve control 16, the temperature regulator 17, the exhaust manifold 18, the exhaust throttle 19, the exhaust throttle control cylinder 20, the inlet manifold heater inlet pipe 21, the inlet manifold heater outlet pipes 22, the high pressure air tank 23, the air retaining valve 24, the pressure regulator 25, the fuel and low pressure air tank 26, the generator valve air inlet pipe 27, the generator valve fuel inlet pipe 28, and the inlet manifold heater spark plug 29.

The inlet manifold 13, includes the upright passage 30, and the inclined passages 31, these passages provide communication from the carburetor 14, to the engine 12, the heating chamber 32, encircles the upper portion of the upright passage 30, hot exhaust gas is admitted to the bottom of this chamber through the passage 33, and passes between the walls of the chamber 32, and of the passage 30, emerging from the upper and opposite side of the chamber 32, through the aperture 34, the exhaust gas enters the curved passages 35, which connect with the inner ends of the passages 36, underneath the inclined passages 31, the exhaust gas is delivered to the atmosphere through the vertical pipes 22, at the outer ends of the passages 36. The circumferential grooves 37, are situated in the passages 31, near their outlet orifices collect and direct liquid fuel into the troughs 38, which are at the bottom of the inclined passages 31, and are separated from the heating passages 36, by a thin wall, these troughs direct the liquid into the circumferential undulated groove 39, of the upright passage 30, thus any liquid fuel in the troughs 38, which has not encountered sufficient heat for vaporization therein will be spread in a film on the hot walls of the upright passage 30, by the groove 39, and will vaporize and mix with the incoming fuel.

The carburetor 14, is a conventional type fitted with a throttle valve to regulate the volume of fuel admitted to the engine through the manifold 13, and is attached to this manifold at the lower end of the upright passage 30.

The temperature regulator 17, (Fig. 4) includes the cylindrical housing 40, which is mounted on the inlet manifold 13, the fluid thermostat 41, the piston 42, the piston rod 43, the trunnion collar 44, which is threaded and pinned to a portion of the piston rod 43, which extends beyond the housing 40, the pivoted lever 45, is supported at its pivot by this housing and is forked, each tang of the forked end is slotted to engage a trunnion 46, of the collar 44, the opposite end of this lever engages the clevis 47, on the upper end of the rod 48, the lower end of this rod connects with the lever and shaft 49, which supports the butterfly valve 50, in the passage 33, one end of the spring 51, is anchored to the manifold 13, and the other end is adjustably connected to the rod 48.

While the engine is at rest, the spring 51, holds the valve 50, closed and holds the piston 42, at the upper end of the cylinder 40, a hole 52, in the manifold 13, and a hole 53, through the thermostat 41, connect the cylinder 40, with the inlet manifold passage 31, and maintain equal pressure in this cylinder and this passage; while the engine is running with the inlet throttle of the carburetor 14, in idling position the piston 42, will be drawn down by the suction in the inlet manifold thereby moving the lever 45, and lifting the rod 48, which opens the valve 50, permitting hot exhaust gas from the exhaust manifold 18, to enter the inlet manifold heating chamber 32.

The thermostat 41, (Fig. 4) consists of the metal bellows 54, capped by the guide 55, this guide is loosely fitted in the piston rod 43, the lower end of the thermostat bellows terminates in the flanged cup 56, the flange of this cup is clamped between the manifold 13 and the regulator housing 40, air sealing the joint and supporting the thermostat 41, the cup 56, protrudes through the hole 57, in the manifold 13, this cup contains the fluid 58, which vaporizes when heated expanding the bellows 54, this fluid is condensed and a partial vacuum exists in the thermostat 41, when it is cold which contracts this thermostat and permits the piston 42, to regulate the valve 50; the heat applied to the chamber 32, and the passages 35, and 36, raises the temperature of the manifold 13, and subsequently heats and expands the thermostat 41, which lifts the piston 42, thereby partially closing the valve 50, and reducing the volume of the heating fluid admitted to the heating chamber 32, the desired temperature being obtained by varying the tension of the spring 51. The pressure in the thermostat 41, and the tension of the spring 51, tend to close the valve 50, the intake suction on the piston 42, tends to open the valve 50, hence this valve has the greatest degree of opening when the engine is running with the inlet throttle in idling position and the manifold is cold, less if the manifold is warm and least when the inlet throttle is wide open and the inlet manifold is warm.

The cup 56, of the thermostat 41, projects through the hole 57, in the manifold 13, at the junction of the passages 30, 31, 31, this portion of the manifold is directly in the path of the incoming fuel, particles of fuel remaining unvaporized after the incoming fuel has traveled through the heated passage 30, will be pelted against the cup 56, cooling and contracting the thermostat 41, permitting an increase in the volume of the hot exhaust gas admitted to the manifold heating chamber thereby increasing the temperature of the manifold to accomplish vaporization of a wet mixture and doing so before the manifold has become chilled.

The thermostat can be eliminated from the temperature regulator, good results are obtainable by regulating the temperature of the inlet manifold by means of inlet suction unaided by a thermostat; I prefer, however, to employ the combination of piston and thermostat as it permits of more rapid heating, provides against overheating and regulates the temperature according to the character of the mixture.

The tanks 23, and 26, the pressure regulator 25, and the generator valve 15, are units of the preheating system used to heat the inlet manifold 13, prior to or while starting the engine, the tank 23, is a reservoir for air which is supplied through the check valve 59, the valve 24 is provided to seal this tank and prevent loss of air when the heater is to be idle for an extended period this valve supports and when open delivers air to the pressure regulator 25, which is a conventional type provided with a handle 60, to adjust the pressure of the air at the outlet 61, air from this outlet is delivered through the pipe 62, and the connection 63, to the tank 26, the valve 64, is provided in the connection 63, to shut off the air supply to the tank 26, to prevent the escape of air while replenishing the fuel supply, this valve 64, (Fig. 10) is shown closed held so by the spring 65, the filler cap 66, has been unscrewed sufficiently to expose the vent hole 67, and this cap may be safely removed, fuel is poured into the tank 26, through the filler elbow 68, the filler cap 66, is screwed in place closing the vent hole 67, and subsequently engaging the pivoted lever 69, lifting the valve 64, and admitting the compressed air to the tank 26.

The generator valve 15, is joined to the generator valve control 16, which is clamped to the inlet manifold 13, the pipe 27, delivers air from the tank 26, to the generator valve inlet passage 70, the valve 71, is interposed between this passage and the generator valve outlet passage 72, this valve is held on its seat 73, by the spring 74, the threaded hole 75, is provided for a connection to receive fuel from the tank 26, through the pipe 28, this fuel is delivered to the valve 71, through the hole 76, in the valve seat 73, the needle valve 77, is provided to regulate the flow of fuel through the hole 76. The generator valve control 16, has an inlet passage 78, and an outlet passage 79, in the housing 80, the valve 81, is interposed between these passages, the stem 82, of this valve extends beyond this housing and is threaded to receive the knob 83, the packing gland 84, is flanged to hold one end of the spring 85, the other end of this spring engages the knob 83, to keep the valve 81, closed. The metallic packing ring 86, (Fig. 5), the asbestos packing 87, and the wire gauze 88, constitute the safety screen 89, which seals the joint between the generator valve 15, and the generator valve control 16, and safeguards against combustion in the generator valve 15, and the tank 26.

Pushing the knob 83, opens the valve 81, permitting air and fuel from the tank 26, to pass the valve 71, the pressure in this tank being sufficient to overcome the spring 74, but insufficient to open the valve 81, this fuel and air will pass through the passage 72, through the screen 88, into the passage 78, past the valve 81, through the passages 79, and 90 to the inlet manifold heating chamber 32, this passage 90, opens into the heating chamber directly opposite the outlet 34, of this chamber, the spark plug 29, is situated in the top of this chamber above the passage 90, and directly in line with the exhaust inlet 33, hence this spark plug is swept by the gases entering this chamber from either of the inlet passages 33, or 90, which prevents this spark plug from becoming fouled.

A means (not shown) is provided to supply high tension electric current to this spark plug while the valve 81, is open, the fuel and air mixture delivered to the chamber 32, is ignited at this spark plug and travels through the same passages as the hot exhaust gas admitted to this chamber through the inlet 33, described on sheets 4 and 5 of this specification.

This arrangement permitting preheating and heating in the same jacket provides for the application of heat where it will be most advantageous in either case, permits the induction system to be quickly brought to normal operating conditions, is simple and economical to manufacture.

Accumulation of fuel in the generator valve while the preheating apparatus is idle which might be caused by seepage and condensation if the fuel tank were placed above the generator valve is obviated by this arrangement, any fuel in the passage 70, or the tube 27, gravitates back to the tank 26, the pressure of the fuel is less than the pressure of the air at the valve 71, due to the weight of the fuel in the tube 28, consequently a leak at the valve 71, will permit air to enter the hole 76, thereby causing the fuel in the pipe 28, to recede; this pipe quickly fills with fuel again when the valve 81, is opened to permit the flow of air through the generator valve, due to the restriction of the air by the spring 74.

The exhaust throttle 19, is provided to restrict the outlet through which the products of combustion from the cylinders of the engine 12, are scavenged; restricting the exhaust in proportion to the volume of fuel admitted by the engine inlet increases the efficiency of the engine, presumably because the greater amount of unscavenged gas in the combustion chamber increases turbulence, heat and pressure of the working fluid and mitigates detonation tendencies. Throttling the exhaust in this manner increases efficiency, notwithstanding that exhaust gas admitted with the incoming fuel of an engine will lower its efficiency, probably due to the greater diffusion of the two fluids in the latter case. This exhaust throttle also provides the inlet manifold heater with an abundance of exhaust gas while the engine is running with a small inlet throttle opening, reduces lubricating oil consumption and carbon accumulation by reducing the suction and increasing compression and temperature in the engine combustion chambers while the engine is running with fractional loads or while coasting.

The exhaust throttle 19, includes the hinged valve 91, which is integral with the shaft 92, one end of this shaft extends beyond the housing 93, and is secured to the lower end of the lever 94, this valve is interposed between the exhaust throttle inlet 95, and the exhaust throttle outlet 96, the spring 97, is provided to open this valve and to prevent clattering which might result from exhaust pulsation, one end of this spring is supported by the housing extension 98, the other end engages the adjustable collar 99, on the threaded portion of the rod 100, one end of this rod is loosely supported by this housing extension, and the other end engages the lever 94, the control cylinder 20, is supported at one end by the extension 98, and contains the piston 101, the piston rod 102, extends beyond this cylinder and engages the upper end of the lever 94, the elbow 103, is screwed into the cylinder 20, and is connected with one end of the pipe 104, the other end of this pipe is connected to the valve 105, screwed into the manifold 13. Suction in the manifold 13, draws air from the cylinder 20, through the elbow 103, the pipe 104, and the valve 105; the piston 101, and the valve 91, (Fig. 8) are shown in the position they will assume when the engine is running with a very light load, and the inlet manifold heater valve 50, is open permitting the exhaust gas from the manifold 18, to pass through the pipe 21, past the valve 50, and subsequently through the passages 33, 32, 34, 35, 36, and to escape through the pipes 22, thereby heating the manifold 13, and expanding the thermostat 41, which will reduce the opening of the valve 50, thereby causing part of the exhaust gas from the exhaust manifold 18, to escape through the exhaust pipe 18', through the passage 95, past the exhaust throttle valve 91, to the outlet pipe 96; the hinged valve 91, being adapted to be opened by exhaust pressure in excess of that provided for by the suction in the cylinder 20.

Suction in the inlet manifold is decreased with an increase in inlet throttle opening and likewise the pull of the piston 101, is less thereby permitting the spring 97, to increase the opening of the valve 91, to correspond to the volume of exhaust gas discharged from the engine which also increases with increased inlet throttle opening; the restriction of the exhaust gas at the valve 91, may be varied by changing the tension of the spring 97, accomplished by shifting the threaded collar 99, increasing the tension of this spring results in less restriction at this valve because this spring opposes the effect of the piston 101.

The valve 105, can be partially closed which will retard the balancing of pressure between the cylinder 20, and the inlet manifold 13, thereby causing the valve 91, to be slow in opening when the fuel inlet throttle is opened, this is especially advantageous when the engine is cold, if the fuel throttle is suddenly opened then the incoming charge is impeded, an additional surge of hot exhaust gas is sent through the inlet heater passages, compression and temperature in the combustion chambers is increased the fuel is vaporized and burned and backfiring through the carburetor is obviated; excellent results are obtained by regulating this valve in conjunction with the carburetor mixture adjustment, the valve to be partially closed while rich mixtures are necessary and opened wide when the engine is warm enough to function with a normal mixture.

The valve 105, may be closed thereby permitting the valve 91, to be held open by the spring 97, and the remainder of the apparatus described in this specification will function with the engine but minus the advantages ascribed to the exhaust throttle. Manual control of the exhaust throttle accomplishes good results but I prefer to employ the intake suction for this purpose inasmuch as the energy required to properly control this valve is enough to become irksome if employed where frequent throttle changes are necessary, and furthermore the restriction of the exhaust throttle automatically increases with increased engine speed for a given inlet throttle opening if the inlet suction is employed to control the exhaust throttle which allows sufficient freedom of the exhaust while the engine is laboring but restricts the exhaust while the engine is running lightly.

The modification shown in Fig. 11 is similar to the temperature regulator shown in Fig. 4, only differing in that the thermostat 41, regulates the valve 50, unaided by the inlet suction, and the hole 57, in the inlet manifold 13, is eliminated as the thermostat is closed at its bottom end with a disc, the thermostat guide 55, is extended beyond the casing 40, and is threaded to receive the trunnion collar 44, this thermostat is shown expanded as it will be when the temperature of the manifold has reached a predetermined point and the valve 50, will be closed preventing further heating of the inlet manifold, as the temperature of the inlet manifold drops it cools and contracts this thermostat which opens this valve to permit an increase of the manifold temperature.

Having thus described the invention, what I claim and desire to cover by Letters Patent is:

1. A device of the class described comprising an internal combustion engine having an intake and exhaust manifold, a compartment adjacent said intake manifold, means for supplying compressed air and fuel into said compartment and there burning the same to heat said intake manifold, said means including a spring controlled valve adapted to admit fuel and air into said compartment when opened and a lighter disposed in said compartment.

2. A device of the class described comprising an internal combustion engine having an intake and exhaust manifold, a compartment adjacent said intake manifold, means for supplying compressed air and fuel into said compartment and there burning the same to heat said intake manifold, means for disconnecting said supply when the engine has started and automatic means for feeding heated exhaust gases to said compartment from said exhaust manifold.

3. A device of the class described comprising an internal combustion engine having an intake and an exhaust manifold, said intake manifold having a vertical and a horizontal portion, a thermostat having a portion located at the junction of said portions, whereby cold unvaporized portions of fuel passing said junction will strike said thermostat portion and means connected with said thermostat and adapted to be operated thereby to cause heat from said exhaust manifold to pass against said intake manifold in varying amounts, dependent upon the temperature at the thermostat.

4. A device for restricting the exhaust of an internal combustion engine, said device being governed by the differential pressures of the atmosphere and of the fuel intake.

5. A device of the class described comprising an internal combustion engine having an intake and an exhaust manifold, a chamber around said intake manifold, a passage leading from said exhaust to said chamber for heating said intake manifold, automatic means for discontinuing the exhaust gases to said chamber when a predetermined heat therein has been obtained and further means governed by the differential pressure of the atmosphere and the fuel intake for restricting said exhaust.

6. A device of the class described comprising an internal combustion engine having an intake and an exhaust manifold, means consisting of a chamber for heating said intake from said exhaust, a compartment connected with said intake having means therein operable by the suction in said intake for varying the amount of heat passing from said exhaust to said chamber and further means governed by the differential pressure of the atmosphere and of the fuel intake for restricting the exhaust gases in said exhaust manifold.

HOMER A. TRUSSELL.